United States Patent
Tan et al.

(10) Patent No.: US 11,585,561 B2
(45) Date of Patent: Feb. 21, 2023

(54) CONTROL METHOD AND DEVICE FOR AIR CONDITIONING SYSTEM AND AIR CONDITIONING SYSTEM

(71) Applicant: Gree Electric Appliances, Inc. of Zhuhai, Guangdong (CN)

(72) Inventors: Jianming Tan, Guangdong (CN); Hua Liu, Guangdong (CN); Mingsheng Zhuo, Guangdong (CN); Peisheng Chen, Guangdong (CN); Qi Cheng, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 106 days.

(21) Appl. No.: 16/964,258

(22) PCT Filed: Dec. 14, 2018

(86) PCT No.: PCT/CN2018/121198
§ 371 (c)(1),
(2) Date: Jul. 23, 2020

(87) PCT Pub. No.: WO2019/153887
PCT Pub. Date: Aug. 15, 2019

(65) Prior Publication Data
US 2021/0041129 A1    Feb. 11, 2021

(30) Foreign Application Priority Data
Feb. 8, 2018   (CN) .......................... 201810130414.4

(51) Int. Cl.
*F24F 11/86*    (2018.01)
*F24F 11/77*    (2018.01)
(Continued)

(52) U.S. Cl.
CPC .............. *F24F 11/86* (2018.01); *F24F 11/63* (2018.01); *F24F 11/77* (2018.01); *G05B 19/042* (2013.01);
(Continued)

(58) Field of Classification Search
CPC .. F24F 11/86; F24F 11/63; F24F 11/77; F24F 2110/10; F24F 2140/12; F24F 2221/10;
(Continued)

(56) References Cited

U.S. PATENT DOCUMENTS

2014/0131009 A1    5/2014  Zhou et al.
2016/0025369 A1*   1/2016  Lim ........................ F24F 11/30
                                                                236/1 C
(Continued)

FOREIGN PATENT DOCUMENTS

CN    101726073 A    6/2010
CN    104006483 A    8/2014
(Continued)

*Primary Examiner* — Michael W Choi
(74) *Attorney, Agent, or Firm* — The Webb Law Firm

(57) ABSTRACT

The present application discloses a control method and device of an air conditioning system, for solving the problem of ineffectively controlling the air supply amount of the air conditioning system in the related art. The disclosed control method includes performing at least one of: acquiring a current discharge air temperature of an air conditioning system and a current operating frequency of a fan, and controlling a compressor of the air conditioning system to adjust an operating frequency of the compressor according to the discharge air temperature and the current operating frequency of the fan; or acquiring a current return air temperature of the air conditioning system and a current operating frequency of the compressor, and adjusting an (Continued)

operating frequency of the fan according to the return air temperature and the current operating frequency of the compressor.

9 Claims, 5 Drawing Sheets

(51) Int. Cl.
  *F24F 11/63* (2018.01)
  *G05B 19/042* (2006.01)
  *F24F 140/12* (2018.01)
  *F24F 110/10* (2018.01)

(52) U.S. Cl.
  CPC ....... *F24F 2110/10* (2018.01); *F24F 2140/12* (2018.01); *G05B 2219/2614* (2013.01)

(58) Field of Classification Search
  CPC ..... F24F 11/64; F24F 2140/20; G05B 19/042; G05B 2219/2614; Y02B 30/70
  See application file for complete search history.

(56) References Cited

U.S. PATENT DOCUMENTS

| 2017/0051941 | A1* | 2/2017 | Horie ................. F24F 13/04 |
| 2017/0211833 | A1* | 7/2017 | Tran ................. F25B 49/022 |
| 2017/0356668 | A1* | 12/2017 | Goel ................. F24F 11/30 |
| 2019/0203962 | A1 | 7/2019 | Takayama |
| 2019/0323717 | A1* | 10/2019 | Xu ................. F24F 11/70 |

FOREIGN PATENT DOCUMENTS

| CN | 104006484 A | 8/2014 |
| CN | 104344510 A | 2/2015 |
| CN | 104697118 A | 6/2015 |
| CN | 105387562 A | 3/2016 |
| CN | 107339777 A | 11/2017 |
| CN | 108375175 A | 8/2018 |
| CN | 106288197 B | 7/2019 |
| EP | 2940395 A1 | 11/2015 |
| EP | 3255352 A1 | 12/2017 |
| GB | 2517023 A | 2/2015 |
| JP | 2001280671 A | 10/2001 |
| WO | 2017208345 A1 | 12/2017 |

* cited by examiner

CONTROL METHOD AND DEVICE FOR AIR CONDITIONING SYSTEM AND AIR CONDITIONING SYSTEM

CROSS-REFERENCE TO RELATED APPLICATIONS

This application is the United States national phase of International Application No. PCT/CN2018/121198 filed Dec. 14, 2018, and claims the priority to Chinese Patent Application No. 201810130414.4 filed Feb. 8, 2018, the disclosures of which are hereby incorporated by reference in their entirety.

BACKGROUND OF THE INVENTION

Field of the Invention

The present disclosure relates to the technical field of air conditioning system, and particularly to a control method and device of an air conditioning system.

Description of Related Art

At present, when an air conditioning system is installed in the field of rail transportation such as subways, a water-cooling direct-cooling air conditioning unit is usually adopted to replace an air conditioning unit in the form of a water chiller and a combined cabinet, based on the consideration of energy conservation and installation space saving. The related water-cooling direct air conditioning unit adjusts the pressure load mainly by detecting an indoor environment temperature so as to adjust the air conditioning load, but does not adopt measures to control an air supply amount, or the air supply amount has to be controlled manually.

SUMMARY OF THE INVENTION

According to an aspect of the present disclosure, there is provided a control method of an air conditioning system, comprising performing at least one of: acquiring a current discharge air temperature of the air conditioning system and a current operating frequency of a fan, and controlling a compressor of the air conditioning system to adjust an operating frequency of the compressor according to the discharge air temperature and the current operating frequency of the fan; or acquiring a current return air temperature of the air conditioning system and a current operating frequency of the compressor, and controlling an operating frequency of the fan according to the return air temperature and the current operating frequency of the compressor.

In some embodiments, that controlling the compressor to adjust an operating frequency of the compressor according to the discharge air temperature and the current operating frequency of the fan comprises: calculating a first difference between the current discharge air temperature and a target discharge air temperature of the air conditioning system; and controlling the operating frequency of the compressor in the air conditioning system according to the first difference and the current operating frequency of the fan.

In some embodiments, controlling the operating frequency of the compressor in the air conditioning system according to the first difference and the current operating frequency of the fan comprises: in the event that the first difference is greater than a preset discharge air temperature deviation, if the current operating frequency of the fan reaches a minimum operating frequency of the fan, controlling the compressor to continuously operate by keeping the current operating frequency, and if the current operating frequency of the fan does not reach the minimum operating frequency of the fan, controlling the compressor to continuously operate by increasing the current operating frequency; and in the event that the first difference is not greater than the preset discharge air temperature deviation, if the current operating frequency of the fan reaches a maximum operating frequency of the fan, controlling the compressor to continuously operate by keeping the current operating frequency, and if the current operating frequency of the fan does not reach the maximum operating frequency of the fan, controlling the compressor to continuously operate by decreasing the current operating frequency.

In some embodiments, in the event that the first difference is greater than the preset discharge air temperature deviation, if the current operating frequency of the fan reaches the minimum operating frequency of the fan, controlling the compressor to continuously operate by keeping the current operating frequency, and if the current operating frequency of the fan does not reach the minimum operating frequency of the fan, controlling the compressor to continuously operate by increasing the current operating frequency; in the event that an opposite number of the first difference is not greater than or equal to the preset discharge air temperature deviation, if the current operating frequency of the fan reaches the maximum operating frequency of the fan, controlling the compressor to continuously operate by keeping the current operating frequency, and if the current operating frequency of the fan does not reach the maximum operating frequency of the fan, controlling the compressor to continuously operate by decreasing the current operating frequency and controlling the fan to continuously operate by increasing the current operating frequency; and in the case that the first difference is not greater than the preset discharge air temperature deviation or the opposite number of the first difference is not greater than the preset discharge air temperature deviation, controlling the compressor to continuously operate by keeping the current operating frequency.

In some embodiments, in the event of controlling the compressor to continuously operate by increasing the current operating frequency, the fan is controlled to continuously operate by decreasing the current operating frequency; and in the event of controlling the compressor to continuously operate by decreasing the current operating frequency, the fan is controlled to continuously operate by increasing the current operating frequency.

In some embodiments, the target discharge air temperature is positively correlated with the current operating frequency of the compressor and positively correlated with a current evaporating temperature.

In some embodiments, controlling the operating frequency of the fan according to the return air temperature and the current operating frequency of the compressor comprises: calculating a second difference between the current return air temperature of the air conditioning system and a set temperature of the air conditioning system; and controlling the operating frequency of the fan in the air conditioning system according to the second difference and the current operating frequency of the compressor.

In some embodiments, that controlling the operating frequency of the fan in the air conditioning system according to the second difference and the current operating frequency of the compressor comprises: in the event that the second difference is greater than a preset return air temperature deviation, if the current operating frequency of the compressor reaches a minimum operating frequency of the compressor or a surge frequency of the compressor, controlling the fan to continuously operate by keeping the current operating frequency, and if the current operating frequency of the compressor does not reach the minimum operating frequency of the compressor or the surge frequency of the compressor, controlling the fan to continuously operate by increasing the current operating frequency; and in the event that the second difference is not greater than the preset return air temperature deviation, if the current operating frequency of the compressor reaches a maximum operating frequency of the compressor or a limit to operating range of the compressor, controlling the fan to continuously operate by keeping the current operating frequency, and if the current operating frequency of the compressor does not reach the maximum operating frequency of the compressor or the limit to operating range of the compressor, controlling the fan to continuously operate by decreasing the current operating frequency.

In some embodiments, in the event that the second difference is greater than the preset return air temperature deviation, if the current operating frequency of the compressor reaches the minimum operating frequency of the compressor or the surge frequency of the compressor, controlling the fan to continuously operate by keeping the current operating frequency, and if the current operating frequency of the compressor does not reach the minimum operating frequency of the compressor or the surge frequency of the compressor, controlling the fan to continuously operate by increasing the current operating frequency; and in the event that an opposite number of the second difference is greater than or equal to the preset return air temperature deviation, if the current operating frequency of the compressor reaches the maximum operating frequency of the compressor or the limit to operating range of the compressor, controlling the fan to continuously operate by keeping the current operating frequency, and if the current operating frequency of the compressor does not reach the maximum operating frequency of the compressor or the limit to operating range of the compressor, controlling the fan to continuously operate by decreasing the current operating frequency.

In some embodiments, in the event of controlling the fan to continuously operate by increasing the current operating frequency, the compressor is controlled to continuously operate by decreasing the current operating frequency; in the event of controlling the fan to continuously operate by decreasing the current operating frequency, the compressor is controlled to continuously operate by increasing the current operating frequency; and in the event that the second difference is not greater than the preset return air temperature deviation or the opposite number of the second difference is not greater than the preset return air temperature deviation, the compressor is controlled to continuously operate by keeping the current operating frequency.

According to a second aspect of the present disclosure, there is provided a control device of an air conditioning system comprising at least one of a first adjusting module or a second adjusting module, wherein: the first adjusting module configured to acquire a current discharge air temperature of the air conditioning system and a current operating frequency of a fan, and control an operating frequency of a compressor of the air conditioning system according to the discharge air temperature and the current operating frequency of the fan; and the second adjusting module configured to acquire a current return air temperature of the air conditioning system and a current operating frequency of the compressor, and control the operating frequency of the fan according to the return air temperature and the current operating frequency of the compressor.

In some embodiments, the first adjusting module comprises: a first calculating unit configured to calculate a first difference between the current discharge air temperature and a target discharge air temperature of the air conditioning system; and a first adjusting unit configured to control the operating frequency of the compressor in the air conditioning system according to the first difference and the current operating frequency of the fan.

In some embodiments, the first adjusting unit comprises: a first adjusting subunit configured to, in the event that the first difference is greater than a preset discharge air temperature deviation, if the current operating frequency of the fan reaches a minimum operating frequency of the fan, control the compressor to continuously operate by keeping the current operating frequency, and if the current operating frequency of the fan does not reach the minimum operating frequency of the fan, control the compressor to continuously operate by increasing the current operating frequency; and a second adjusting subunit configured to, in the event that the first difference is not greater than the preset discharge air temperature deviation, if the current operating frequency of the fan reaches a maximum operating frequency of the fan, control the compressor to continuously operate by keeping the current operating frequency, and if the current operating frequency of the fan does not reach the maximum operating frequency of the fan, control the compressor to continuously operate by decreasing the current operating frequency.

In some embodiments, the first adjusting unit comprises: a first adjusting subunit configured to, in the event that the first difference is greater than the preset discharge air temperature deviation, if the current operating frequency of the fan reaches the minimum operating frequency of the fan, control the compressor to continuously operate by keeping the current operating frequency, and if the current operating frequency of the fan does not reach the minimum operating frequency of the fan, control the compressor to continuously operate by increasing the current operating frequency; and a second adjusting subunit configured to, in the event that an opposite number of the first difference is not greater than or equal to the preset discharge air temperature deviation, if the current operating frequency of the fan reaches the maximum operating frequency of the fan, control the compressor to continuously operate by keeping the current operating frequency, and if the current operating frequency of the fan does not reach the maximum operating frequency of the fan, control the compressor to continuously operate by decreasing the current operating frequency, wherein, in the case that the first difference is not greater than the preset discharge air temperature deviation or the opposite number of the first difference is not greater than the preset discharge air temperature deviation, the compressor continuously operates by keeping the current operating frequency.

In some embodiments, in the event of controlling the compressor to continuously operate by increasing the current operating frequency, the fan is controlled to continuously operate by decreasing the current operating frequency; and in the event of controlling the compressor to continuously operate by decreasing the current operating frequency, the fan is controlled to continuously operate by increasing the current operating frequency.

In some embodiments, the second adjusting module comprises: a second calculating unit configured to calculate a second difference between the current return air temperature of the air conditioning system and a set temperature of the air conditioning system; and a second adjusting unit configured to adjust the operating frequency of the fan in the air conditioning system according to the second difference and the current operating frequency of the compressor.

In some embodiments, the second adjusting unit comprises: a third adjusting subunit configured to, in the event that the second difference is greater than a preset return air temperature deviation, if the current operating frequency of the compressor reaches a minimum operating frequency of the compressor or a surge frequency of the compressor, control the fan to continuously operate by keeping the current operating frequency, and if the current operating frequency of the compressor does not reach the minimum operating frequency of the compressor or the surge frequency of the compressor, control the fan to continuously operate by increasing the current operating frequency; and a fourth adjusting subunit configured to, in the event that the second difference is not greater than the preset return air temperature deviation, if the current operating frequency of the compressor reaches a maximum operating frequency of the compressor or a limit to operating range of the compressor, control the fan to continuously operate by keeping the current operating frequency, and if the current operating frequency of the compressor does not reach the maximum operating frequency of the compressor or the limit to operating range of the compressor, control the fan to continuously operate by decreasing the current operating frequency.

In some embodiments, the second adjusting unit comprises: a third adjusting subunit configured to, in the event that the second difference is greater than the preset return air temperature deviation, if the current operating frequency of the compressor reaches the minimum operating frequency of the compressor or the surge frequency of the compressor, control the fan to continuously operate by keeping the current operating frequency, and if the current operating frequency of the compressor does not reach the minimum operating frequency of the compressor or the surge frequency of the compressor, control the fan to continuously operate by increasing the current operating frequency; and a fourth adjusting subunit configured to, in the event that an opposite number of the second difference is greater than or equal to the preset return air temperature deviation, if the current operating frequency of the compressor reaches the maximum operating frequency of the compressor or the limit to operating range of the compressor, control the fan to continuously operate by keeping the current operating frequency, and if the current operating frequency of the compressor does not reach the maximum operating frequency of the compressor or the limit to operating range of the compressor, control the fan to continuously operate by decreasing the current operating frequency.

In some embodiments, in the event of controlling the fan to continuously operate by increasing the current operating frequency, the compressor is controlled to continuously operate by decreasing the current operating frequency; in the event of controlling the fan to continuously operate by decreasing the current operating frequency, the compressor is controlled to continuously operate by increasing the current operating frequency; and in the event that the second difference is not greater than the preset return air temperature deviation or the opposite number of the second difference is not greater than the preset return air temperature deviation, the compressor is controlled to continuously operate by keeping the current operating frequency.

According to a third aspect of the present disclosure, there is provided an control device comprising: a memory; and a processor coupled to the memory, the processor configured to perform the control method of any of the preceding embodiments based on instructions stored in the memory.

According to a fourth aspect of the present disclosure, there is provided a computer-readable storage medium having stored thereon a computer program which, when executed by a processor, implements the control method of any of the preceding embodiments.

According to a fifth aspect of the present disclosure, there is provided an air conditioning system comprising a temperature sensor and a controller. The temperature sensor is configured to detect a current discharge air temperature or return air temperature of the air conditioning system. The controller is configured to perform at least one of: acquiring the current discharge air temperature of the air conditioning system and a current operating frequency of a fan, and controlling a compressor of the air conditioning system to adjust an operating frequency of the compressor according to the discharge air temperature and the current operating frequency of the fan; or acquiring the current return air temperature of the air conditioning system and a current operating frequency of the compressor, and adjusting an operating frequency of the fan according to the return air temperature and the current operating frequency of the compressor.

In some embodiments, the air conditioning system further comprises: a pressure sensor configured to detect an suction pressure for determining an evaporation temperature of the air conditioning system, the evaporation temperature being positively correlated with a target discharge air temperature.

DESCRIPTION OF THE INVENTION

Figure 1:
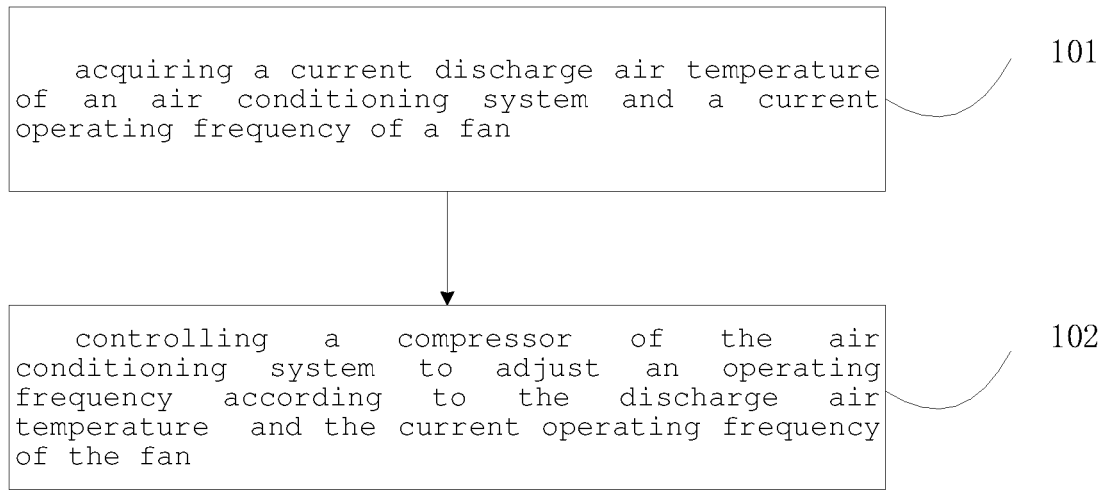
FIG. 1 is a flow chart illustrating a first control method of an air conditioning system according to some embodiments of the present application.

Reference will now be made in detail to the exemplary embodiments, examples of which are illustrated in the accompanying drawings. The following description refers to the accompanying drawings in which the same numbers in different drawings represent the same or similar elements unless otherwise indicated. The implementations described in the exemplary embodiments below do not represent all implementations consistent with the present disclosure. Rather, they are merely examples of the device and method consistent with some aspects of the present disclosure, as detailed in the appended claims.

In the related art, the control mode of the air supply amount will cause an unreasonable air supply amount, a large fluctuation in discharge air temperature and a poor user experience; when the load changes, after the air conditioning unit adjusts the operation parameters, it results in a larger overall operation energy consumption of the air conditioning unit; and when the air conditioning unit operates, since the compressor, the fan and the corresponding frequency converter are not in the optimal operating state, the reliability of the system is reduced.

The present disclosure provides a control method and device of an air conditioning system, so as to at least solve the problem that the air supply amount of an air conditioning system cannot be effectively controlled in the related art.

The embodiments of the present application provide solutions, to control the compressor to adjust an operating frequency according to the discharge air temperature of the air conditioning system and the current operating frequency of the fan, and/or adjust the operating frequency of the fan according to the return air temperature and the current operating frequency of the compressor, such that the compressor and the fan of the air conditioning system work at the best frequency, to effectively control the air supply amount of the air conditioning system and make the air supply amount of the air conditioning system more reasonable, thereby improving user experience.

In some embodiments, to achieve energy conservation in the air conditioning system, the operating frequency of the compressor is controlled by the discharge air temperature, and a target value of the discharge air temperature is associated with the compressor frequency and the compressor operating evaporating temperature. The operating frequency of the air supply fan is controlled by the return air temperature, and a temperature set by a user is achieved by controlling the return air temperature.

In one case, the air conditioning system according to the present embodiment may comprise: a magnetic suspension centrifugal compressor, a water-cooled condenser, an electronic expansion valve, a direct evaporation type fin evaporator and a frequency conversion air supply fan, etc. The sensor may comprise: a high-pressure sensor, a low-pressure sensor, a temperature sensor for sensing indoor environment temperature, a temperature sensor for sensing discharge air temperature, a temperature sensor for sensing cooling water inlet temperature and a temperature sensor for sensing cooling water outlet temperature.

The control method of an air conditioning system according to the embodiment comprises the following processes: acquiring a current discharge air temperature of the air conditioning system and a current operating frequency of a fan, and controlling a compressor of the air conditioning system to adjust an operating frequency according to the discharge air temperature and the current operating frequency of the fan; and/or acquiring a current return air temperature of the air conditioning system and a current operating frequency of the compressor, and adjusting an operating frequency of the fan according to the return air temperature and the current operating frequency of the compressor.

Figure 2:
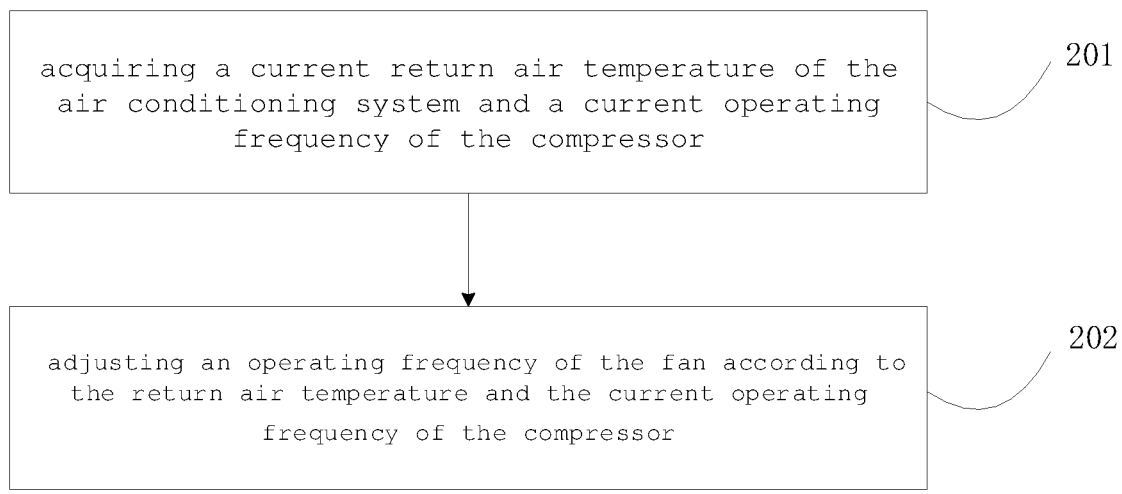
FIG. 2 is a flow chart illustrating a second control method of an air conditioning system according to some embodiments of the present application.
Figure 3:
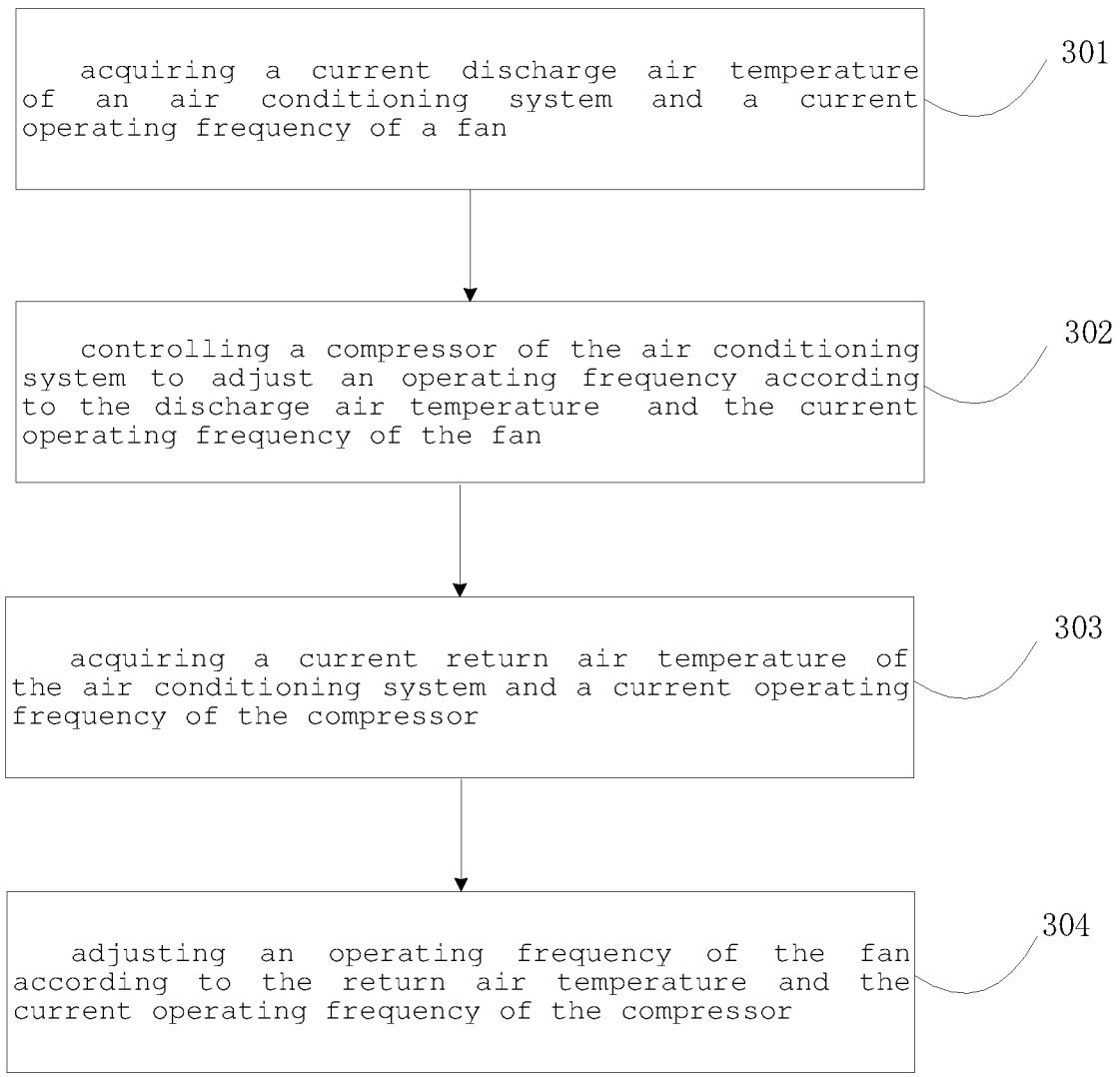
FIG. 3 is a flow chart illustrating a third control method of an air conditioning system according to some embodiments of the present application.

In summary, the control method of an air conditioning system according to the present embodiment comprises three cases as shown in FIGS. 1 to 3. In the case shown in FIG. 1, the control method of an air conditioning system comprises the following steps: step 101: acquiring a current discharge air temperature of the air conditioning system and a current operating frequency of a fan; and step 102: controlling a compressor of the air conditioning system to adjust an operating frequency of the compressor according to the discharge air temperature and the current operating frequency of the fan.

In the case shown in FIG. 2, the control method of an air conditioning system comprises the following steps: step 201, acquiring a current return air temperature of the air conditioning system and a current operating frequency of the compressor; and step 202, adjusting the operating frequency of the fan according to the return air temperature and the current operating frequency of the compressor.

In the case shown in FIG. 3, the control method of an air conditioning system comprises: step 301, acquiring a current discharge air temperature of the air conditioning system and a current operating frequency of a fan; step 302, controlling a compressor of the air conditioning system to adjust an operating frequency according to the discharge air temperature and the current operating frequency of the fan; step 303, acquiring a current return air temperature of the air conditioning system and a current operating frequency of the compressor; and step 304, adjusting the operating frequency of the fan according to the return air temperature and the current operating frequency of the compressor.

When the control method of an air conditioning system shown in FIG. 3 is performed, step 301 and step 302 may be executed first, and then step 303 and step 304, or step 303 and step 304 may be executed first, and then step 301 and step 302, or step 301 and step 303 may be executed first, and then step 302 and step 304.

When the control method of an air conditioning system according to the present embodiment is performed, one of the three methods shown in FIGS. 1 to 3 may be executed alternatively according to actual control demands.

In this embodiment, controlling the compressor to adjust an operating frequency according to the discharge air temperature and the current operating frequency of the fan comprises: calculating a first difference between the current discharge air temperature and a target discharge air temperature of the air conditioning system; and adjusting the operating frequency of the compressor in the air conditioning system according to the first difference and the current operating frequency of the fan. In some embodiments, adjusting the operating frequency of the compressor in the air conditioning system according to the first difference and the current operating frequency of the fan comprises: in the event that the first difference is greater than a preset discharge air temperature deviation, if the current operating frequency of the fan reaches a minimum operating frequency of the fan, controlling the compressor to continuously operate by keeping the current operating frequency, and if the current operating frequency of the fan does not reach the minimum operating frequency of the fan, controlling the compressor to continuously operate by increasing the current operating frequency; and in the event that the first difference is not greater than the preset discharge air temperature deviation, if the current operating frequency of the fan reaches a maximum operating frequency of the fan, controlling the compressor to continuously operate by keeping the current operating frequency, and if the current operating frequency of the fan does not reach the maximum operating frequency of the fan, controlling the compressor to continuously operate by decreasing the current operating frequency. The preset discharge air temperature deviation can be 1° C. for example.

In this embodiment, that adjusting the operating frequency of the fan according to the return air temperature and the current operating frequency of the compressor comprises: calculating a second difference between the current return air temperature of the air conditioning system and a set temperature of the air conditioning system; and adjusting the operating frequency of the fan in the air conditioning system according to the second difference and the current operating frequency of the compressor, wherein the set temperature of the air conditioning system can be an indoor target temperature set by a user through a control panel or a remote controller of the air conditioning system. In some embodiments, adjusting the operating frequency of the fan in the air conditioning system according to the second difference and the current operating frequency of the compressor comprises: in the event that the second difference is greater than a preset return air temperature deviation, if the current operating frequency of the compressor reaches a minimum operating frequency of the compressor or a surge frequency of the compressor, controlling the fan to continuously operate by keeping the current operating frequency, and if the current operating frequency of the compressor does not reach the minimum operating frequency of the compressor or the surge frequency of the compressor, controlling the fan to continuously operate by increasing the current operating frequency; and in the event that the second difference is not greater than the preset return air temperature deviation, if the current operating frequency of the compressor reaches a maximum operating frequency of the compressor or a limit to operating range of the compressor, controlling the fan to continuously operate by keeping the current operating frequency, wherein the limit to operating range of the compressor can be a limit pressure range of a suction pressure or an exhaust pressure of the compressor in the operating process, or a limit current range endured by the compressor, or a limit temperature range of an exhaust port temperature of the compressor, and if the current operating frequency of the compressor does not reach the maximum operating frequency of the compressor or the limit to operating range of the compressor, controlling the fan to continuously operate by decreasing the current operating frequency. The return air temperature deviation may be 1° C., for example.

If the target discharge air temperature is too low, problems such as too low evaporation temperature, low operation energy efficiency of the compressor and low energy efficiency of the whole machine will occur. If the target discharge air temperature is too high, problems such as too large a power consumption of the air supply fan and low energy efficiency of the whole machine will occur. The determination of the target discharge air temperature is thus critical throughout the control of the air conditioning system. In the present embodiments, the target discharge air temperature may be predicted as follows: target discharge air temperature=current evaporation temperature+a*current compressor frequency+b, i.e., Tms=Te+a*Fy+b, where a and b are constants, Te is the evaporation temperature at the current time moment, and Fy is the operating frequency of the compressor at the current time moment. The target discharge air temperature is associated with the current evaporation temperature and the current operating frequency of the compressor, so that the target discharge air temperature can be obtained by integrating the operating frequency of the compressor and the operating frequency of the fan. The target discharge air temperature calculated by the formula is an optimal discharge air temperature point associated with the operating frequency of the compressor and the operating evaporation temperature of the compressor, and after the optimal discharge air temperature point is estimated, the operating frequency of the compressor and/or the operating frequency of the fan can be adjusted based on a relationship between the current discharge air temperature and the optimal discharge air temperature point, so that the compressor and the fan can operate in the most energy-saving state.

The following brief description of the various parameters involved in this application is provided to facilitate an understanding of the present application.

The compressor frequency is a control frequency of a compressor calculated and outputted by a controller in the air conditioning system or an operating frequency fed back from the compressor. The fan frequency is a control frequency of a fan calculated and outputted by a controller in the air conditioning system or an operating frequency fed back from the fan. The evaporation temperature is a saturation temperature corresponding to the suction pressure, and may be determined based on the pressure value detected by the pressure sensor. For example, a corresponding temperature value may be calculated by looking up a table based on the obtained pressure value. The return air temperature is a return air temperature detected at a return air inlet of the air conditioning system in real time. The discharge air temperature is a temperature detected at an air supply outlet of the air conditioning system in real time. The target discharge air temperature can be obtained according to the above formula for calculating the target discharge air temperature, and is a parameter changing in real time. The target indoor temperature can be set through the control panel of the air conditioning system. The discharge air temperature deviation and the return air temperature deviation can be set through the control panel of the air conditioning system, and both are generally set to be 1° C.

In the control methods of an air conditioning system provided in the present embodiments, the compressor is controlled to adjust an operating frequency according to the discharge air temperature of the air conditioning system and the current operating frequency of the fan, and/or the operating frequency of the fan is adjusted according to the return air temperature and the current operating frequency of the compressor, so that the compressor and the fan of the air conditioning system work at the optimal frequency, and the air conditioning system has a stable load adjusting capacity and a small discharge air temperature fluctuation, and the energy consumption of the air conditioning system is further reduced on the basis of improving the comfort level of the user.

The control processes of controlling the air conditioning system by adjusting the operating frequency of the compressor and controlling the air conditioning system by adjusting the operating frequency of the fan will be described below, respectively.

Figure 4:
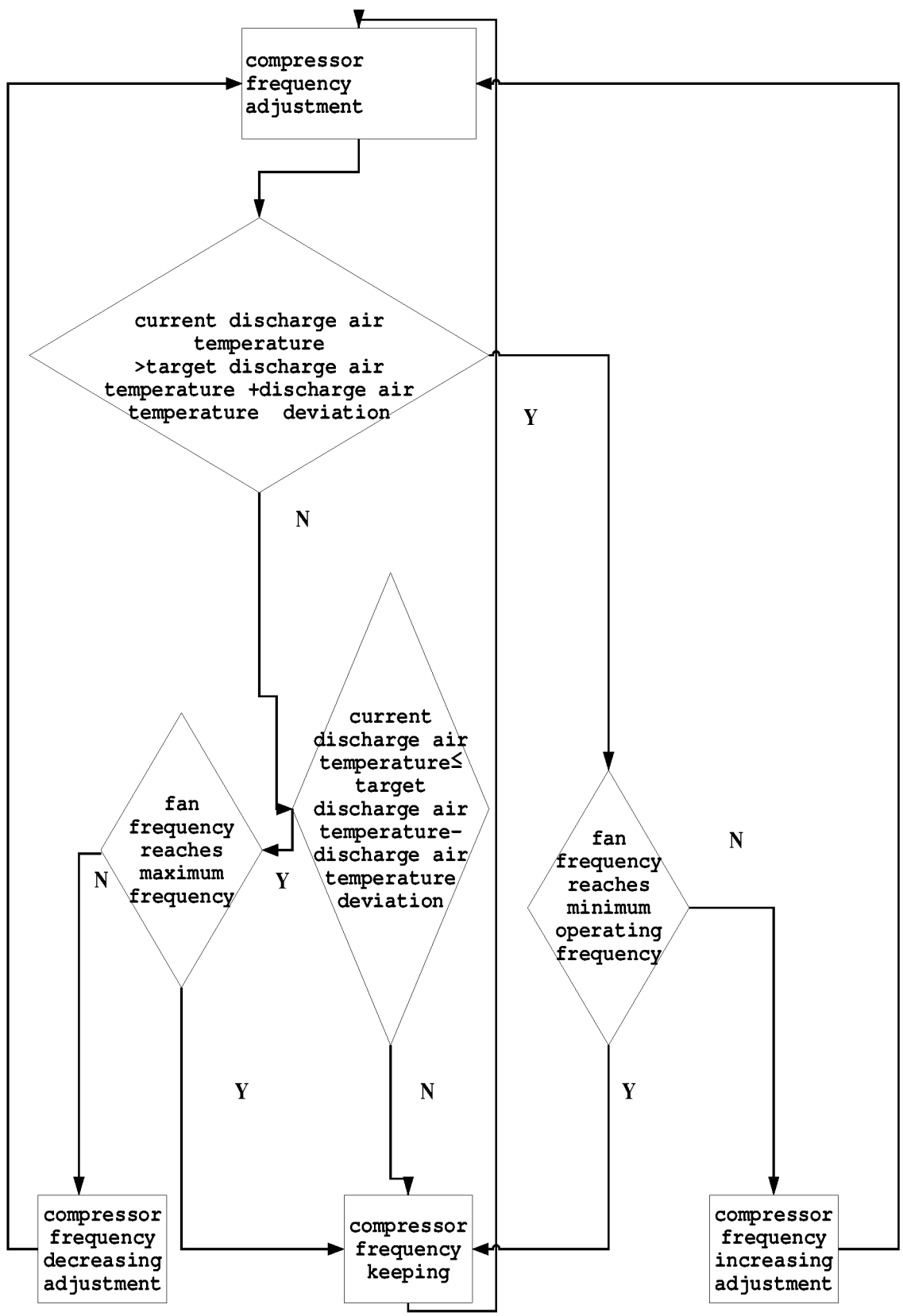
FIG. 4 is a schematic diagram illustrating a compressor control process according to some embodiments of the present application.

FIG. 4 illustrates a process of controlling the air conditioning system by adjusting the operating frequency of the compressor, as shown in FIG. 4, comprising: when the following conditions are met, the compressor performing frequency increasing control, namely, controlling the compressor to increase the operating frequency on the basis of the current operating frequency: first condition, discharge air temperature Ts>target discharge air temperature Tm+discharge air temperature deviation ΔTs, the first condition aiming at controlling the discharge air temperature to reach the optimal target discharge air temperature; and second condition, fan frequency Fs>fan minimum operating frequency, the second condition aiming at ensuring that the fan can decrease the frequency after the compressor increases the frequency, so as to ensure a stable return air temperature.

When the following conditions are simultaneously met, the compressor performs frequency decrease control, namely, the compressor is controlled to decrease the operating frequency on the basis of the current operating frequency:

first condition, discharge air temperature Ts≤target discharge air temperature Tm−discharge air temperature deviation ΔTs, the first condition aiming at ensuring that the discharge air temperature reaches the optimal target discharge air temperature; and second condition, fan frequency Fs<fan maximum operating frequency, the second condition aiming at ensuring that the fan can increase the frequency after the compressor decreases the frequency, so as to ensure a stable return air temperature.

As shown in FIG. 4, in other cases, the compressor continuously operates by keeping the current operating frequency, and when the load changes, the corresponding temperature parameter may be re-acquired, and the above process of controlling the operating frequency of the compressor may be executed once again.

Figure 5:
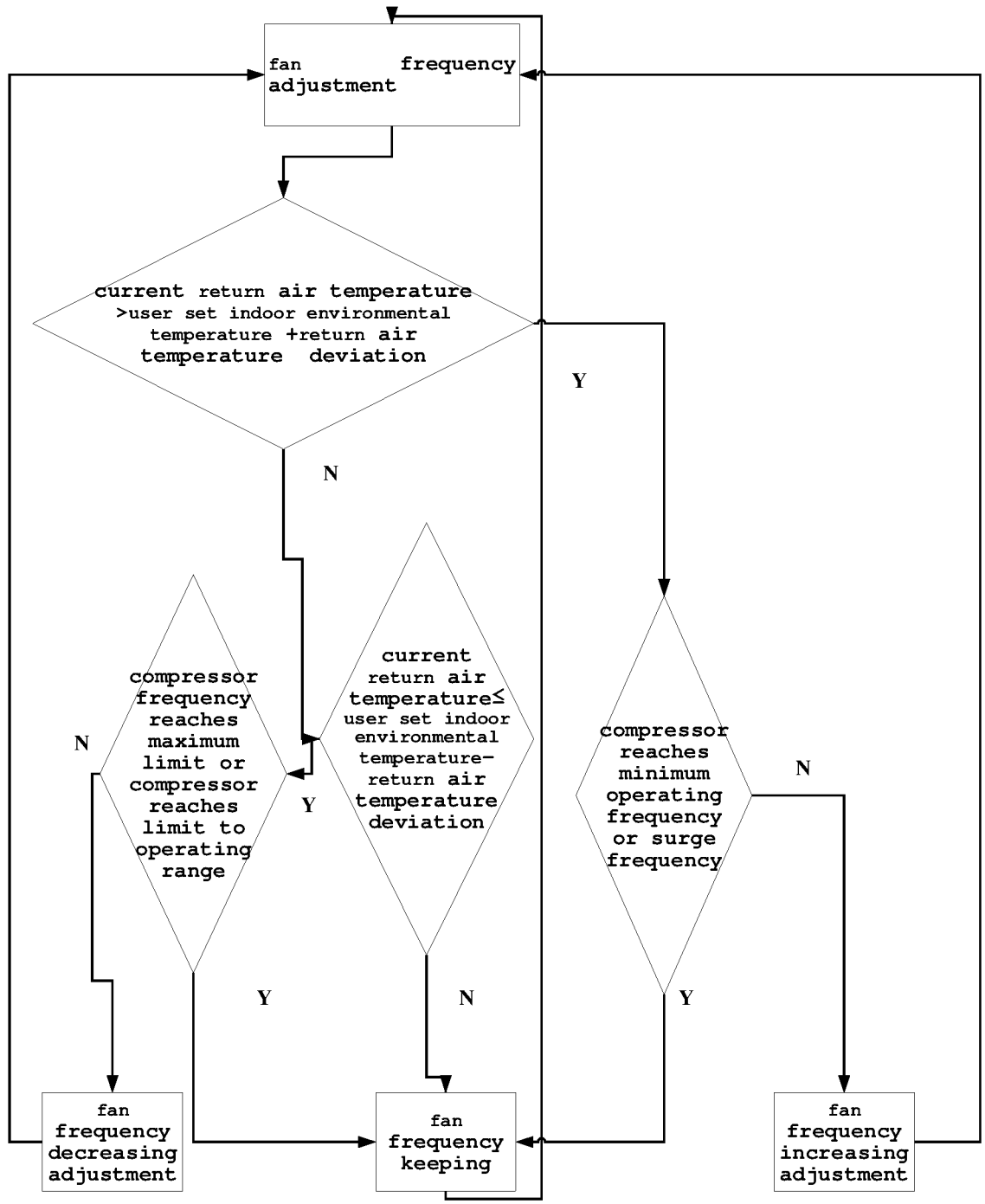
FIG. 5 is a schematic diagram illustrating a fan control process according to some embodiments of the present application.

FIG. 5 illustrates a process of controlling the air conditioning system by adjusting the operating frequency of the fan. As shown in FIG. 5, the control process comprises: when the following conditions are simultaneously met, the fan performing frequency increase control, e.g., controlling the fan to increase its operating frequency on the basis of the current operating frequency:

first condition, return air temperature Th>target indoor temperature Tms+return air temperature deviation ΔTh, the first condition aiming at ensuring that the return air temperature meets the requirement of the user, wherein the target indoor temperature corresponds to the set temperature of the air conditioning system; and second condition, compressor frequency Fy>compressor minimum operating frequency, or compressor frequency Fy>compressor surge frequency, the second condition aiming at ensuring that the compressor can decrease the frequency after the fan increases the frequency, so as to ensure a stable discharge air temperature.

When the following conditions are simultaneously met, the fan performs frequency decrease control:

first condition, return air temperature Th≤target indoor temperature Tms−return air temperature deviation ΔTh, the first condition aiming at ensuring that the return air temperature meets the requirements of the user; and second condition, compressor frequency Fy<compressor maximum limit frequency or compressor limit to operating range, the second condition aiming at ensuring that the compressor can increase the frequency after the fan decreases the frequency, so as to ensure a stable discharge air temperature.

As shown in FIG. 5, in the other cases, the fan continuously operates by keeping its current operating frequency, and when the load changes, the corresponding temperature parameter may be re-acquired, and the above process of controlling the operating frequency of the fan may be executed once again.

Figure 6:
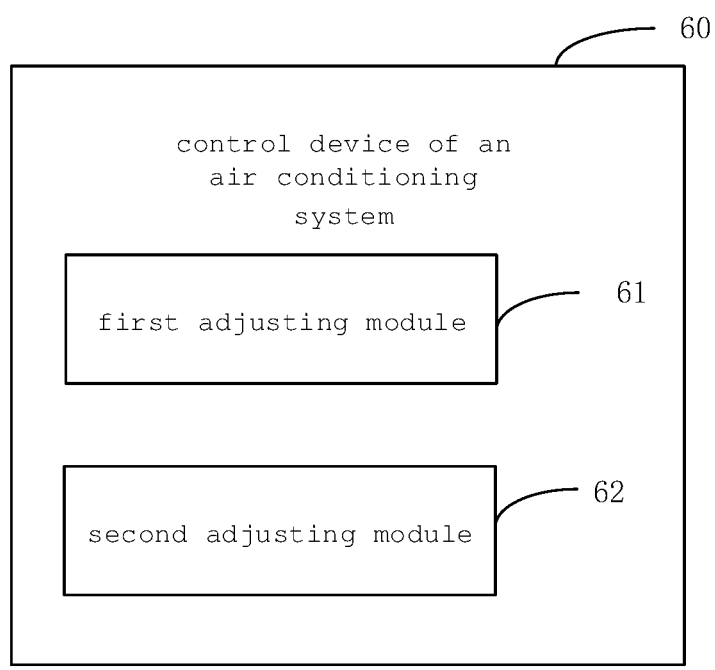
FIG. 6 is a block diagram illustrating a control device according to some embodiments of the present application.

According to some embodiments of the present disclosure, there is provided a control device of an air conditioning system. FIG. 6 is a block diagram of the device, and as shown in FIG. 6, the device 60 comprises the following components:

a first adjusting module 61 configured to acquire a current discharge air temperature of the air conditioning system and a current operating frequency of a fan, and control a compressor of the air conditioning system to adjust an operating frequency according to the discharge air temperature and the current operating frequency of the fan; and/or a second adjusting module 62 configured to acquire a current return air temperature of the air conditioning system and a current operating frequency of the compressor, and control the operating frequency of the fan according to the return air temperature and the current operating frequency of the compressor.

It should be noted that, in the present embodiments, the control device 60 may have only the first adjusting module 61, or have only the second adjusting module 62, or may have both the first adjusting module 61 and the second adjusting module 62 as shown in FIG. 6.

The first adjusting module comprises: a first calculating unit configured to calculate a first difference between the current discharge air temperature and a target discharge air temperature of the air conditioning system; and a first adjusting unit configured to adjust the operating frequency of the compressor in the air conditioning system according to the first difference and the current operating frequency of the fan. In some embodiments, the first adjusting unit comprises: a first adjusting subunit configured to, in the event that the first difference is greater than a preset discharge air temperature deviation, if the current operating frequency of the fan reaches a minimum operating frequency of the fan, control the compressor to continuously operate by keeping the current operating frequency, and if the current operating frequency of the fan does not reach the minimum operating frequency of the fan, control the compressor to continuously operate by increasing the current operating frequency; and a second adjusting subunit configured to, in the event that the first difference is not greater than the preset discharge air temperature deviation, if the current operating frequency of the fan reaches a maximum operating frequency of the fan, control the compressor to continuously operate by keeping the current operating frequency, and if the current operating frequency of the fan does not reach the maximum operating frequency of the fan, control the compressor to continuously operate by decreasing the current operating frequency.

The second adjusting module 62 comprises: a second calculating unit configured to calculate a second difference between the current return air temperature of the air conditioning system and a set temperature of the air conditioning system; and a second adjusting unit configured to adjust the operating frequency of the fan in the air conditioning system according to the second difference and the current operating frequency of the compressor. In some embodiments, the second adjusting unit comprises: a third adjusting subunit configured to, in the event that the second difference is greater than a preset return air temperature deviation, if the current operating frequency of the compressor reaches a minimum operating frequency of the compressor or a surge frequency of the compressor, control the fan to continuously operate by keeping the current operating frequency, and if the current operating frequency of the compressor does not reach the minimum operating frequency of the compressor or the surge frequency of the compressor, control the fan to continuously operate by increasing the current operating frequency; and a fourth adjusting subunit configured to, in the event that the second difference is not greater than the preset return air temperature deviation, if the current operating frequency of the compressor reaches a maximum operating frequency of the compressor or a limit to operating range of the compressor, control the fan to continuously operate by keeping the current operating frequency, and if the current operating frequency of the compressor does not reach the maximum operating frequency of the compressor or the limit to operating range of the compressor, control the fan to continuously operate by decreasing the current operating frequency.

In the control device provided in this embodiment, the compressor is controlled to adjust an operating frequency according to the discharge air temperature of the air conditioning system and the current operating frequency of the fan, and/or the operating frequency of the fan is adjusted according to the return air temperature and the current operating frequency of the compressor, so that the compressor and the fan of the air conditioning system work at the optimal frequency, and the air conditioning system has a stable load adjusting capacity and a small discharge air temperature fluctuation, and the energy consumption of the air conditioning system is further reduced on the basis of improving the comfort level of the user.

Other embodiments of the present disclosure will be apparent to those skilled in the art from consideration of the specification and practice of the invention disclosed herein. This application is intended to cover any variations, uses, or adaptations of the present disclosure, and all these variations, uses, or adaptations follow general principles of the present disclosure and contain common knowledge or customary technical means in the technical field not invented by the present disclosure. It is intended that the specification and embodiments be considered as exemplary only, with a true scope and spirit of the present disclosure being indicated by the following claims.

It will be understood that the present disclosure is not limited to the precise arrangements that have been described above and shown in the drawings, and that various modifications and changes may be made without departing from the scope thereof. The scope of the present disclosure is limited only by the appended claims.

What is claimed is:

1. A control method of an air conditioning system, comprising:
    acquiring a current discharge air temperature of the air conditioning system and a current operating frequency of a fan, and controlling a compressor of the air conditioning system to adjust an operating frequency of the compressor according to the current discharge air temperature and the current operating frequency of the fan, wherein the current discharge air temperature is a temperature detected at an air supply outlet of the air conditioning system in real time,
    wherein controlling the compressor to adjust an operating frequency of the compressor according to the current discharge air temperature and the current operating frequency of the fan comprises:
    calculating a first difference between the current discharge air temperature and a target discharge air temperature of the air conditioning system; and
    controlling the operating frequency of the compressor in the air conditioning system according to the first difference and the current operating frequency of the fan,
    wherein controlling the operating frequency of the compressor in the air conditioning system according to the first difference and the current operating frequency of the fan comprises:
    in the event that the first difference is greater than a preset discharge air temperature deviation, controlling the compressor to continuously operate by keeping the current operating frequency thereof if the current operating frequency of the fan reaches a minimum operating frequency of the fan, and controlling the compressor to continuously operate by increasing the current operating frequency thereof if the current operating frequency of the fan does not reach the minimum operating frequency of the fan;
    in the event that an opposite number of the first difference is greater than or equal to the preset discharge air temperature deviation, controlling the compressor to continuously operate by keeping the current operating frequency thereof if the current operating frequency of the fan reaches a maximum operating frequency of the fan, and controlling the compressor to continuously operate by decreasing the current operating frequency thereof if the current operating frequency of the fan does not reach the maximum operating frequency of the fan; and
    in the event that the first difference is not greater than the preset discharge air temperature deviation or the opposite number of the first difference is not greater than the preset discharge air temperature deviation, controlling the compressor to continuously operate by keeping the current operating frequency thereof.

2. The control method according to claim 1, wherein:
    in the event of controlling the compressor to continuously operate by increasing the current operating frequency thereof, the fan is controlled to continuously operate by decreasing the current operating frequency thereof; and
    in the event of controlling the compressor to continuously operate by decreasing the current operating frequency thereof, the fan is controlled to continuously operate by increasing the current operating frequency thereof.

3. The control method according to claim 1, wherein the target discharge air temperature is positively correlated with the current operating frequency of the compressor and positively correlated with a current evaporating temperature.

4. An control device of an air conditioning system comprising:
    a memory; and
    a processor coupled to the memory, the processor configured to perform the control method according to claim 1 based on instructions stored in the memory.

5. A non-transient computer-readable storage medium having stored thereon a computer program which, when executed by a processor, implements the control method according to claim 1.

6. A control device of an air conditioning system, comprising a first adjusting module, wherein:
    the first adjusting module is configured to acquire a current discharge air temperature of the air conditioning system and a current operating frequency of a fan, and control an operating frequency of a compressor of the air conditioning system according to the current discharge air temperature and the current operating frequency of the fan, wherein the current discharge air temperature is a temperature detected at an air supply outlet of the air conditioning system in real time,
    wherein the first adjusting module comprises:
    a first calculating unit configured to calculate a first difference between the current discharge air temperature and a target discharge air temperature of the air conditioning system; and
    a first adjusting unit configured to control the operating frequency of the compressor in the air conditioning system according to the first difference and the current operating frequency of the fan,
    wherein the first adjusting unit comprises:
    a first adjusting subunit configured to, in the event that the first difference is greater than a preset discharge air temperature deviation, control the compressor to continuously operate by keeping the current operating frequency thereof if the current operating frequency of the fan reaches a minimum operating frequency of the fan, and control the compressor to continuously operate by increasing the current operating frequency thereof if the current operating frequency of the fan does not reach the minimum operating frequency of the fan; and a second adjusting subunit configured to, in the event that an opposite number of the first difference is greater than or equal to the preset discharge air temperature deviation, control the compressor to continuously operate by keeping the current operating frequency thereof if the current operating frequency of the fan reaches a maximum operating frequency of the fan, and control the compressor to continuously operate by decreasing the current operating frequency thereof if the current operating frequency of the fan does not reach the maximum operating frequency of the fan, wherein in the event that the first difference is not greater than the preset discharge air temperature deviation or the opposite number of the first difference is not greater than the preset discharge air temperature deviation, the compressor continuously operates by keeping the current operating frequency thereof.

7. The control device according to claim 6, wherein:
in the event of controlling the compressor to continuously operate by increasing the current operating frequency thereof, the fan is controlled to continuously operate by decreasing the current operating frequency thereof, and
in the event of controlling the compressor to continuously operate by decreasing the current operating frequency thereof, the fan is controlled to continuously operate by increasing the current operating frequency thereof.

8. An air conditioning system comprising:
a temperature sensor configured to detect a current discharge air temperature or return air temperature of the air conditioning system; and
a controller configured to:
acquire the current discharge air temperature of the air conditioning system and a current operating frequency of a fan, and control a compressor of the air conditioning system to adjust an operating frequency of the compressor according to the current discharge air temperature and the current operating frequency of the fan, wherein the current discharge air temperature is a temperature detected at an air supply outlet of the air conditioning system in real time,
wherein controlling the compressor to adjust an operating frequency of the compressor according to the current discharge air temperature and the current operating frequency of the fan comprises:
calculating a first difference between the current discharge air temperature and a target discharge air temperature of the air conditioning system; and
controlling the operating frequency of the compressor in the air conditioning system according to the first difference and the current operating frequency of the fan,
wherein controlling the operating frequency of the compressor in the air conditioning System according to the first difference and the current operating frequency of the fan comprises:
in the event that the first difference is greater than a preset discharge air temperature deviation, controlling the compressor to continuously operate by keeping the current operating frequency thereof if the current operating frequency of the fan reaches a minimum operating frequency of the fan, and controlling the compressor to continuously operate by increasing the current operating frequency thereof if the current operating frequency of the fan does not reach the minimum operating frequency of the fan;
in the event that an opposite number of the first difference is greater than or equal to the preset discharge air temperature deviation, controlling the compressor to continuously operate by keeping the current operating frequency thereof if the current operating frequency of the fan reaches a maximum operating frequency of the fan, and controlling the compressor to continuously operate by decreasing the current operating frequency thereof if the current operating frequency of the fan does not reach the maximum operating frequency of the fan; and
in the event that the first difference is not greater than the preset discharge air temperature deviation or the opposite number of the first difference is not greater than the preset discharge air temperature deviation, controlling the compressor to continuously operate by keeping the current operating frequency thereof.

9. The air conditioning system according to claim 8, further comprising:
a pressure sensor configured to detect an suction pressure for determining an evaporation temperature of the air conditioning system, the evaporation temperature being positively correlated with a target discharge air temperature.

* * * * *